No. 691,173. Patented Jan. 14, 1902.
J. A. PERKINS.
ROLLER BEARING.
(Application filed Jan. 6, 1900.)
(No Model.)

Witnesses:
J. C. Shaw
Adolf C. Kaiser

Inventor,
Julius A. Perkins.
by Crosby Gregory
Atty's.

UNITED STATES PATENT OFFICE.

JULIUS A. PERKINS, OF OMAHA, NEBRASKA, ASSIGNOR TO MOFFETT BEARING COMPANY, OF COUNCIL BLUFFS, IOWA.

ROLLER-BEARING.

SPECIFICATION forming part of Letters Patent No. 691,173, dated January 14, 1902.

Application filed January 6, 1900. Serial No. 531. (No model.)

*To all whom it may concern:*

Be it known that I, JULIUS A. PERKINS, a citizen of the United States, residing at Omaha, in the county of Douglas and State of Nebraska, have invented an Improvement in Roller-Bearings for Shafts or Spindles in Lathes and Grinding or other Machinery, of which the following description, in connection with the accompanying drawings, is a specification, like letters on the drawings representing like parts.

In the use of lathes, grinding machinery, and machinery having fine construction for doing accurate work it is essential that the shaft or rotative parts run substantially without friction and with the minimum of vibration and that the effect of the end thrust of the shaft be resisted without friction. In my experiments to provide a roller-bearing for use in connection with machinery such as referred to I have discovered that friction due to the end thrust of a horizontal shaft carrying a load and running at high speed may be compensated for by providing the shaft with a tapering surface and interposing between said surface and a surrounding inclined track conical bearing-rollers contained in traveling cages and having interposed between the ends of said rollers and the cage and between the rollers and their supports antifriction means. The tendency of conical rollers so applied is to ride up the tapering surface of the incline toward the larger diameter thereof, as a belt climbs to the larger end of a cone, and if this tendency is not resisted or overcome the bearing would soon be destroyed. Consequently to prevent injury of the bearing due to the tendency of the conical roller to climb the inclined surface of the shaft I provide the shaft with collars, preferably made adjustable, and for greater endurance of the parts I provide at the larger end of the cage a wear-plate, and to coöperate with the large end of the cage or the wear-plate and to obviate rubbing friction which would injure the same by wear I interpose at the face of each collar carried by the shaft and moving therewith, it constituting a cage-controller, antifriction means, which is herein illustrated as balls.

Inasmuch as my invention is applicable to any high-speed rotating journal or shaft, it will be obvious that it may be embodied in many different classes of machinery so I have herein illustrated it only as a type.

Figure 1:
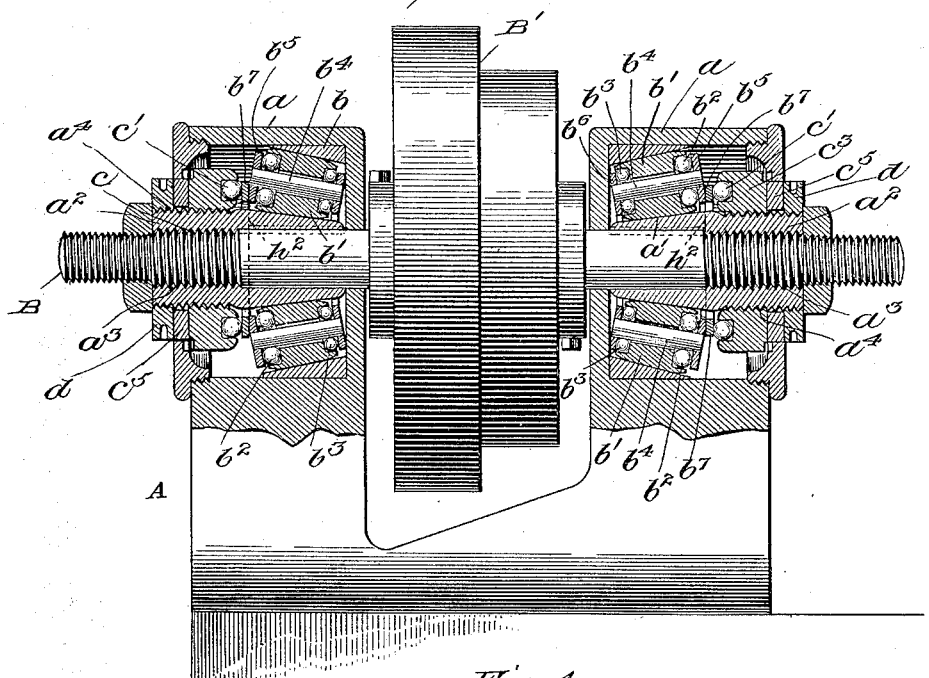
Figure 4:
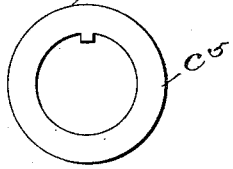
Figure 2:
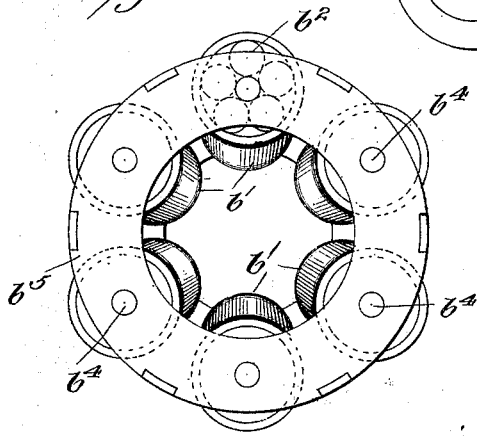
Figure 3:
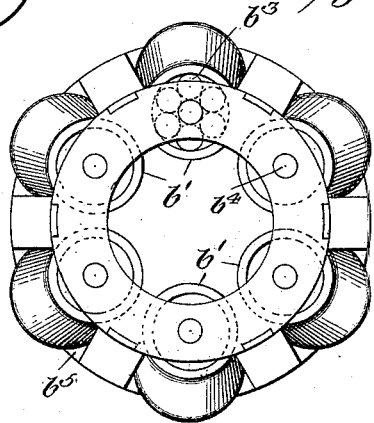
Figure 5:
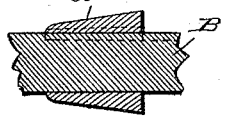

Figure 1 of the drawings represents, partially in longitudinal section, a roller-bearing embodying my invention in one approved form. Fig. 2 shows the enlarged end of said cage and its rollers. Fig. 3 shows the smaller end of one of the cages. Fig. 4 shows the lock-nut washer detached. Fig. 5 shows a modified form of sleeve.

Referring to the drawings representing my invention in one approved form, let it be supposed that A represents a suitable yoke forming part of any usual lathe or grinding-machine, and B a shaft or spindle provided, as herein shown, with a suitable pulley B' to be actuated by a belt, or instead of said pulley and belt I may employ any other usual device for transmitting power to said shaft to rotate it at a high speed. The boxes $a$ of the yoke contain suitable tracks $b$, applied therein in any suitable manner, the inner faces of said tracks being inclined at an angle to the longitudinal center of the shaft B, said shaft having applied to it or being provided with tapering sleeves $a'$, which in Fig. 1 are represented as threaded internally at $a^3$ to engage suitable screw-threads $c$, formed upon the shaft. The inclined faces of the tracks $b$ and of the sleeves $a'$ converge inwardly toward the shaft, said converging faces, if prolonged, crossing each other at a point intersecting the longitudinal axis of the shaft or spindle. Between these inclined surfaces I have placed a series of conical bearing-rollers $b'$, chambered at their ends, (see Fig. 1,) said chambers containing antifriction means, represented as balls $b^2 b^3$, surrounding and running about fixed non-rotating supports $b^4$, sustained in the end walls $b^5 b^6$ of rigid cages, the balls also preventing contact of the ends of the rollers with the inner walls of the cages. These cages, that they may be efficient and durable, have each applied to their larger ends a hardened wearing plate or surface $b^7$, which in the rotation of the cages travels in contact with antifriction means, represented as a series of antifriction-balls $c'$, located in annular grooves made in adjustable collars or cagecontrollers $c^3$, represented as screw-threaded internally and applied to the external screw-threads $a^4$ of the sleeves, said collars being maintained in their adjusted position by suitable set-nuts $d$, also screwed upon the exterior threads of the sleeves, a suitable lock-nut washer $c^5$ (see Fig. 4) being interposed between each of said set-nuts and said collars, they forming end-thrust means. I have shown the sleeves as threaded and applied to the shaft by the engagement of the threads of the sleeve with threads on the shaft; but this invention is not in all instances limited to confining the sleeve upon the shaft by means of a screw-thread; but such construction is convenient. The sleeves could, however, be adjusted one toward the other by or through the action of a suitable nut or device applied to a threaded part of the shaft, the nut corresponding with the threaded end of the sleeve, or, in other words, this invention would not be departed from were the sleeve separated in the dotted line $h^2$ (see Fig. 1) and in full lines, Fig. 5, and then the interior of the sleeve and the exterior of the shaft will be united by a suitable spline within the sleeve, (shown by dotted lines in said figures,) it entering a groove in the shaft. For the best results and to obviate wearing friction the balls should be interposed between said collars $c^3$ and the larger ends of the cages, and while I have shown the balls as carried by said collars $c^3$ it will be obvious that the balls might be contained in a suitable groove in the larger end of the cage, the balls running against a smooth-faced end-thrust collar or any suitable track applied thereto.

I believe that I am the first to surround a shaft to run at high speed with a plurality of tapering surfaces acted upon by conical bearing-rollers alined in traveling cages, the said rollers also contacting with the inner faces of inclined tracks. In a bearing of this sort the inclination of the surface of the shaft surrounded by the rollers and inclined bearings tends to reduce the end thrust; but in practice the higher the speed the greater the tendency of the cage and its rollers to travel up the incline of the tapered surface of the shaft, and if this tendency is not overcome the bearing will be destroyed. Hence I have provided means which tends to resist this upward climbing of the bearing-rollers. To do this and enable the rollers to be run without rubbing friction and to enable the cage to travel and not be injured by rubbing friction, I have provided the shaft with adjustable collars and have interposed antifriction means between said collars and the larger end of the cage, and to further provide against wear of the cage I may and preferably will apply to its larger end a wearing-plate, and so also in a bearing of this class means must be provided for taking up any wear of the parts for insuring exactly the proper contact at all times of the peripheries of the bearing-rollers with the peripheries of the conical surfaces over which they run, and to insure this to the greatest nicety one of each pair of such tapering surfaces should be adjustable, and herein I have shown the sleeves surrounding the shaft as adjustable in the direction of the longitudinal axis of the shaft, and I desire to claim, broadly, in an antifriction-bearing a plurality of tapering faces adjustable one toward the other and sustaining roller-bearings.

The shaft herein described when used in a grinding or other machine may have a suitable grinding tool or device applied to the end thereof outside of the box, it being understood that the shaft may receive any tool which it is desired to rotate at a very high speed and have it run accurately, or the shaft may have applied to it any usual or suitable chuck capable of holding any stock usually treated or manipulated in lathes, and it will be understood that the shaft may hold any device or thing which is to be rotated rapidly, said device or thing being applied to it in any suitable manner.

The bearing-rollers $b'$ have their flanged ends reduced in diameter to thereby afford a space between the rollers and the faces of the tracks $b$ and the face of the tapering surfaces $a'$ to thereby obviate hammering of the flanges.

Having described my invention, what I claim as new, and desire to secure by Letters Patent, is—

1. In an antifriction roller-bearing, a shaft, suitable surrounding tracks presenting inclined faces, a plurality of tapering sleeves carried by said shaft, the surfaces of said sleeves being inclined one toward the other, a plurality of rigid traveling cages having each a series of non-rotatable supports, a series of conical bearing-rollers surrounding said supports, and antifriction means contacting with said supports and said cages and preventing the rubbing of said rollers against either said cage or supports.

2. In an antifriction roller-bearing, a shaft, suitable surrounding tracks presenting inclined faces, a plurality of tapering sleeves carried by said shaft and having their faces inclined toward the shaft, a plurality of rigid traveling cages having each a series of supports, a series of conical bearing-rollers surrounding said supports, and antifriction means sustaining the ends of said bearing-rollers and preventing the contact of said rollers with said cage or the roller-supports.

3. A shaft, surrounding tracks presenting inclined faces, means to sustain said tracks, tapering sleeves carried by the shaft, rigid traveling cages having each a series of non-rotatable supports, a series of conical bearing-rollers surrounding said supports and chambered at their ends, a series of balls located in said chambers and interposed between and preventing contact of said rollers with the walls of said cage and with said supports.

4. A shaft, tracks presenting inclined faces and surrounding said shaft, means to sustain said tracks, sleeves carried by the shaft and presenting tapering faces, rigid traveling cages having roller-supports, conical rollers surrounding said supports and interposed between said tracks and sleeves, and means at the larger end of said cage and contacting only therewith to prevent the cage from sliding away from the longitudinal center of said shaft.

5. In a roller-bearing of the class described, a shaft, a conical sleeve applied thereto, a rigid traveling cage provided with roller-supports, tapered bearing-rollers revoluble about said sleeve, a wearing-plate secured to the larger end of said traveling cage, and end-thrust means containing a series of balls running against said wearing-plate.

6. A shaft having oppositely-inclined tapering sleeves, a box, tracks therein presenting inclined faces, rigid traveling cages having bearing-rollers interposed between said tracks and the inclined sleeves, adjustable end-thrust means, and a series of balls interposed between the larger ends of said cages and said end-thrust means.

7. In a roller-bearing of the class described, a shaft, a plurality of conical sleeves applied thereto, and threaded externally; combined with end-thrust plates containing each a series of balls, and check-nuts to confine said end-thrust plates in position.

8. A shaft, a sleeve having a tapered face mounted thereon, a track surrounding said shaft and presenting an inclined face, a box to sustain and inclose said track, a traveling cage containing inclined spindles, a series of conical rollers interposed between said sleeve and track, antifriction means to prevent contact of said rollers with said cage and said spindles, a wearing-plate at the larger end of said cage, a collar mounted at one end of said sleeve and rotatable in the same direction as the cage but at a faster speed, and antifriction means interposed between said collar and said plate.

9. In a roller-bearing of the class described, a shaft, a plurality of conical sleeves applied thereto, a plurality of traveling cages containing bearing-rollers and surrounding said sleeves, a plurality of end-thrust means applied to said shaft and having antifriction means contacting only with the larger ends of said cages, and means to confine said end-thrust means in working position.

10. In an antifriction roller-bearing, a shaft, suitable surrounding tracks presenting inclined faces, a plurality of tapering sleeves carried by said shaft and having their faces inclined toward the shaft, a plurality of rigid traveling cages having each a series of supports, a series of conical bearing-rollers surrounding said supports, antifriction means sustaining the ends of said bearing-rollers and preventing the contact of said rollers with said cage or the roller-supports, and means to move the conical sleeves carried by the shaft longitudinally of the axis of said shaft.

11. In an antifriction roller-bearing, a shaft presenting an inclined surface, a traveling cage having a series of supports, and a series of conical bearing-rollers surrounding said supports, means carried by and traveling with said shaft and coöperating with the larger end of the cage to prevent the rollers and cage from climbing the incline of the surface of the shaft.

12. In an antifriction roller-bearing, a shaft presenting an inclined surface, a traveling cage having a series of supports, and a series of conical bearing-rollers surrounding said supports, means carried by and traveling with said shaft and coöperating with the larger end of the cage to prevent the rollers and cage from climbing the incline of the surface of the shaft, and antifriction means interposed between the means traveling with said shaft and the larger end of the cage to obviate wear of the cage.

13. The combination of a series of inclined rollers, inner and outer bearing-cones for the same, means for spacing said rollers such as a cage, and a series of balls engaging and receiving the endwise pressure of said spacing means.

14. In an antifriction roller-bearing, a shaft, and a hub provided each with inclined surfaces, an interposed, loosely-sustained, traveling cage freely movable with relation to both said inclined surfaces and having a series of supports, a series of conical rollers contacting with said inclined surfaces, and holding means independent of said inclined surfaces and acting against said cage to prevent the same from being moved in a direction to enable said rollers to slide upwardly on the inclined surface of the shaft.

15. The combination of a series of inclined rollers, inner and outer bearing-cones against which said rollers contact, means for spacing said rollers, such as a cage, and a device adjustable longitudinally of said bearing-cones and contacting with said cage to determine the position of said cage and rollers, and prevent them from moving upwardly on said cones.

In testimony whereof I have signed my name to this specification in the presence of two subscribing witnesses.

JULIUS A. PERKINS.

Witnesses:
GEO. W. GREGORY,
M. A. DUNN.